(12) United States Patent
Yap

(10) Patent No.: US 9,266,579 B2
(45) Date of Patent: Feb. 23, 2016

(54) COMPACT FOLDING BICYCLE WITH SINGLE FRAME HINGE

(71) Applicant: Fook Fah Yap, Singapore (SG)

(72) Inventor: Fook Fah Yap, Singapore (SG)

( * ) Notice: Subject to any disclaimer, the term of this patent is extended or adjusted under 35 U.S.C. 154(b) by 21 days.

(21) Appl. No.: 14/258,887

(22) Filed: Apr. 22, 2014

(65) Prior Publication Data

US 2015/0225033 A1 Aug. 13, 2015

Related U.S. Application Data

(60) Provisional application No. 61/938,747, filed on Feb. 12, 2014.

(51) Int. Cl.
*B62K 15/00* (2006.01)
*B62K 3/00* (2006.01)

(52) U.S. Cl.
CPC .............. *B62K 15/006* (2013.01); *B62K 15/00* (2013.01); *B62K 15/008* (2013.01); *B62K 3/005* (2013.01); *B62K 2015/001* (2013.01)

(58) Field of Classification Search
CPC .... B62K 15/00; B62K 15/006; B62K 15/008; B62K 2015/001
See application file for complete search history.

(56) References Cited

U.S. PATENT DOCUMENTS

| 550,399 | A | * | 11/1895 | Anderson | 280/205 |
|---|---|---|---|---|---|
| 633,746 | A | * | 9/1899 | Anderson | 280/266 |
| 3,392,991 | A | * | 7/1968 | Ryan et al. | 280/282 |
| 3,860,264 | A | * | 1/1975 | Douglas et al. | 280/266 |
| 4,718,688 | A |  | 1/1988 | Sanders |  |
| 4,895,386 | A |  | 1/1990 | Hellestam et al. |  |
| 5,836,602 | A |  | 11/1998 | Wang |  |
| 6,270,095 | B1 | * | 8/2001 | Chang | 280/87.041 |
| 6,364,335 | B1 |  | 4/2002 | Mombelli |  |
| 6,450,517 | B1 | * | 9/2002 | Lee | B62K 3/002 16/429 |
| 6,799,771 | B2 |  | 10/2004 | Bigot |  |

(Continued)

FOREIGN PATENT DOCUMENTS

| DE | 102008038339 A1 * | 2/2010 | ............... B62K 3/00 |
|---|---|---|---|
| EP | 0026800 B1 | 5/1984 | |

(Continued)

OTHER PUBLICATIONS

Jango bikes website: www.jangobikes.com, Apr. 22, 2014.

(Continued)

*Primary Examiner* — Joseph Rocca
*Assistant Examiner* — Maurice Williams
(74) *Attorney, Agent, or Firm* — MP Patents, LLC

(57) ABSTRACT

A bicycle is configured for conversion between expanded and folded arrangements and includes a main frame assembly comprising a main frame member coupled with the front assembly, rear wheel carriers extending from the main frame member along a first orientation and a bottom bracket protruding from the main frame member along a second orientation. A front assembly of the vehicle includes a quick release, a head tube configured to receive a fork and a seat tube configured to receive a saddle. The main frame assembly further includes elongate seat stays coupled with the rear wheel carrier and each seat stay includes a latch configured for locking with a quick release provided to the front assembly. With seat stays latches released the head tube and seat tube pivot together relative to the main frame member on a single hinge during conversions between the expanded and folded arrangements.

19 Claims, 8 Drawing Sheets

(56) References Cited

U.S. PATENT DOCUMENTS

| | | | |
|---|---|---|---|
| 6,986,522 B2 | 1/2006 | Sinclair et al. | |
| 7,040,443 B1 * | 5/2006 | Roth | B62K 3/002 180/220 |
| 8,414,005 B2 * | 4/2013 | Garcia et al. | 280/205 |
| 8,430,414 B1 | 4/2013 | Yap | |
| 8,523,212 B2 * | 9/2013 | Ryan et al. | 280/287 |
| 2007/0013162 A1 | 1/2007 | Whyte | |
| 2007/0210556 A1 | 9/2007 | Hon et al. | |
| 2011/0148061 A1 * | 6/2011 | Johnson et al. | 280/87.041 |
| 2012/0280468 A1 * | 11/2012 | Garcia et al. | 280/274 |

FOREIGN PATENT DOCUMENTS

| | | |
|---|---|---|
| EP | 0505598 A1 | 9/1992 |
| EP | 1600368 A2 | 4/2005 |
| EP | 2492175 A1 | 2/2011 |
| WO | 8605155 A1 | 9/1986 |
| WO | 2004041631 A1 | 5/2004 |

OTHER PUBLICATIONS

Mike Hanlon, GizMag website: www.gizmag.com/myway-compact-smallest-fold-up-electric-scooter/22475/, May 9, 2012.
Designbuzz, Design Buzz Website: www.designbuzz.com/7-foldable-scooters-smart-efforless-transportation/ , Oct. 27, 2011.
StigoBike website: stigobike.com/ , Apr. 3, 2014.
Antonio Pasolini, GizMag website: www.gizmag.com/jac-electric-scooter/25928/ , Jan. 23, 2013.
Greenmuze, GreenMuze website: www.greenmuze.com/climate/travel/1799-urban-scooter-fo-adults-.html/, Nov. 10, 2009.
Dahonbikes Website, May 8, 2013.
Pacific Cycles Website, May 8, 2013.
Birdy Bike Website, Jul. 24, 2013: http://www.birdybike.com.
Bickerton Website, Jul. 24, 2013: http://www.bickertonportables.co.uk.
Chris Burns, Aug. 13, 2013: 'Fold Your Saddle', Yanko Design—Form Beyond Function.

* cited by examiner

COMPACT FOLDING BICYCLE WITH
SINGLE FRAME HINGE

CROSS REFERENCE TO RELATED APPLICATIONS

This application claims the priority benefit of U.S. Provisional Application No. 61/938,747 on Feb. 12, 2014 which is incorporated herein by reference in its entirety.

BACKGROUND

Today, a great variety of folding bicycles and other folding vehicles are available. However, these bicycles are still too bulky when folded to be conveniently portable for mixed-mode commuting in a city. This is particularly noticeable when commuting includes travel on a crowded bus or mass rapid transit train. Further, folding or unfolding bicycles often involves multiple steps that are tedious as well as time-and labor-intensive.

SUMMARY

In one aspect of the disclosure, a vehicle is configured for conversion between expanded and folded arrangements and includes a front assembly having a head tube and a seat tube; a saddle telescopically coupled with the seat tube; a main frame assembly including a main frame member pivotally coupled with the front assembly by a frame hinge; a rear wheel rotatably held by rear wheel carriers extending from the main frame member; and a front wheel rotatably held by a fork rotatably received in the head tube. The head tube is generally located between the seat tube and the rear wheel.

In another aspect, a vehicle is configured for conversion between expanded and folded arrangements and includes a front assembly having a head tube and a seat tube; a saddle telescopically coupled with the seat tube; a fork rotatably received in the head tube; a handlebar supported by a handle bar stem rotatably coupled with the head tube; a main frame assembly including rear wheel carriers extending from a main frame member provided with a crankset bottom bracket; a frame hinge pivotally coupling the front assembly to the main frame member; rotatably coupled to the crankset bottom bracket, a crankset comprising a plurality of cranks; a front wheel rotatably held by the fork; a rear wheel rotatably held by the rear wheel carriers. There is no interference between the front wheel and the crank during pedaling and steering and the main frame assembly further includes elongate seat stays coupled with the rear wheel carrier and wherein each seat stay includes a latch configured for locking with a quick release provided to the front assembly.

In still another aspect, a bicycle is configured for conversion between expanded and folded arrangements and includes a front assembly having, a quick release, a head tube configured to receive a fork and a seat tube configured to receive a saddle. A main frame assembly of the vehicle includes a main frame member coupled with the front assembly, rear wheel carriers extending from the main frame member along a first orientation and a bottom bracket protruding from the main frame member along a second orientation. Elongate seat stays are coupled with the rear wheel carriers distal from the main frame member and each seat stay is configured for locking with the quick release. A rear wheel is held between the rear wheel carriers of the main frame member. The head tube and seat tube pivot together relative to the main frame member on a single hinge during conversions between the expanded and folded arrangements.

DETAILED DESCRIPTION

The present disclosure relates generally to a vehicle with small-diameter wheels which is arranged for quick folding. Once folded, the vehicle assumes a compact, long and narrow package with dimensions comparable to a folded adult kickboard scooter and can be readily stored in tight spaces on public transportation, in the workplace or at home. In the folded arrangement, it can be moved by rolling on a surface with one hand in a manner similar to rolling a folded baby stroller.

The folding process is simple and can be performed quickly with only a single hinge joint in the main frame. When unfolded into an expanded, riding arrangement, the vehicle assumes a geometry that can be readily adjusted to fit adult riders of most heights. The vehicle is ideal for use in intermodal passenger transport where a short section of the journey is best commuted by a vehicle such as a bicycle.

Figure 5:
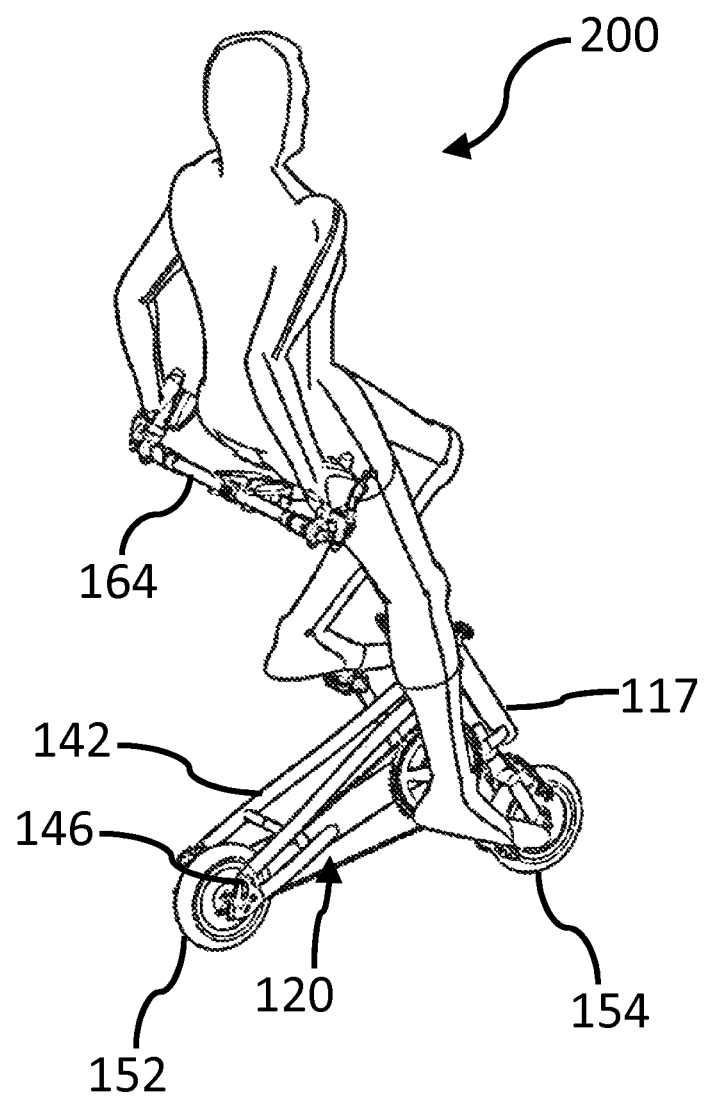
FIG. 5 illustrates a right side perspective view of a rider on the example vehicle in the typical riding position.
Figure 6:
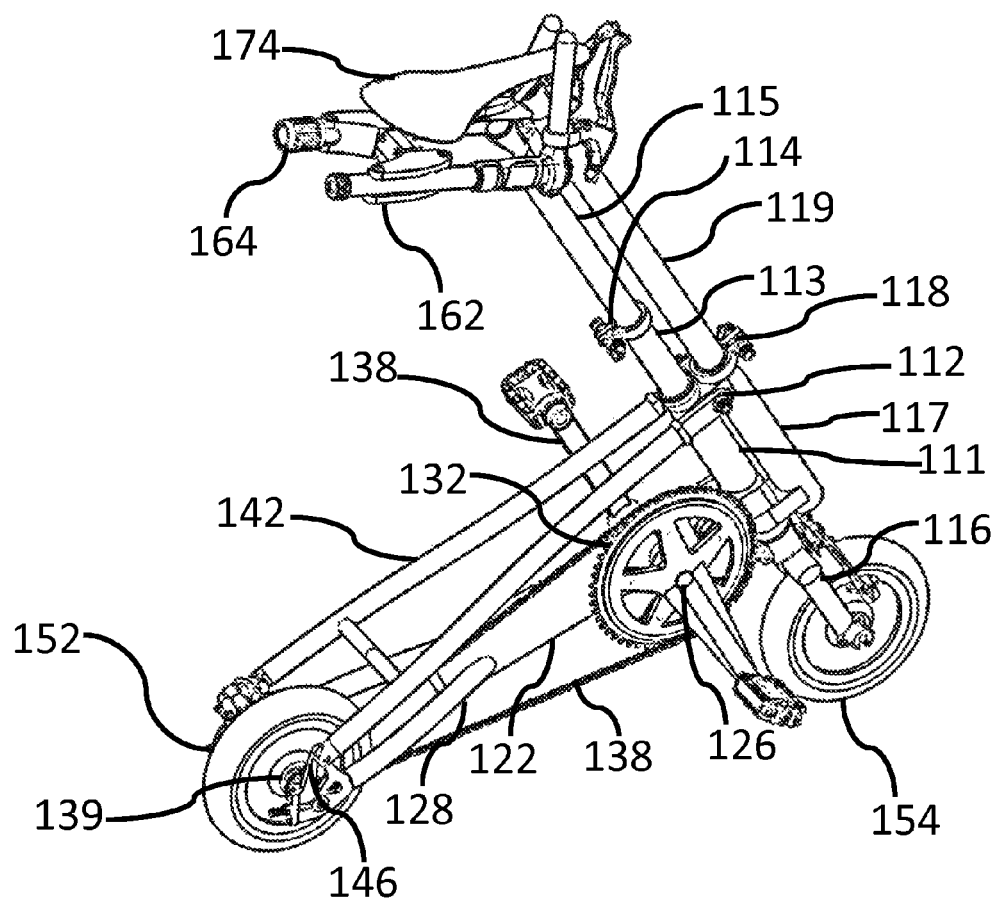
FIG. 6 illustrates a right-side perspective view the example vehicle in a partially folded arrangement.
Figure 7:
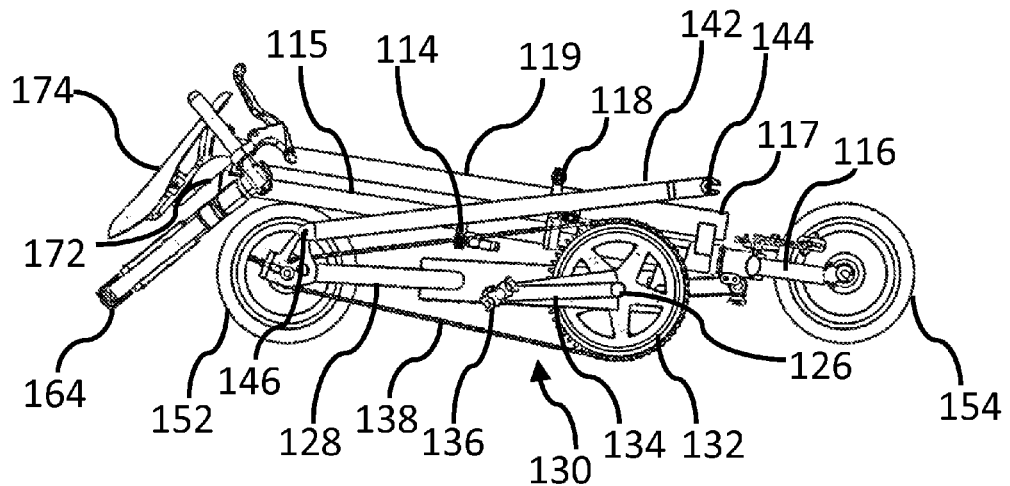
FIG. 7 illustrates a right side elevation view of the example vehicle in a fully folded arrangement.
Figure 8:
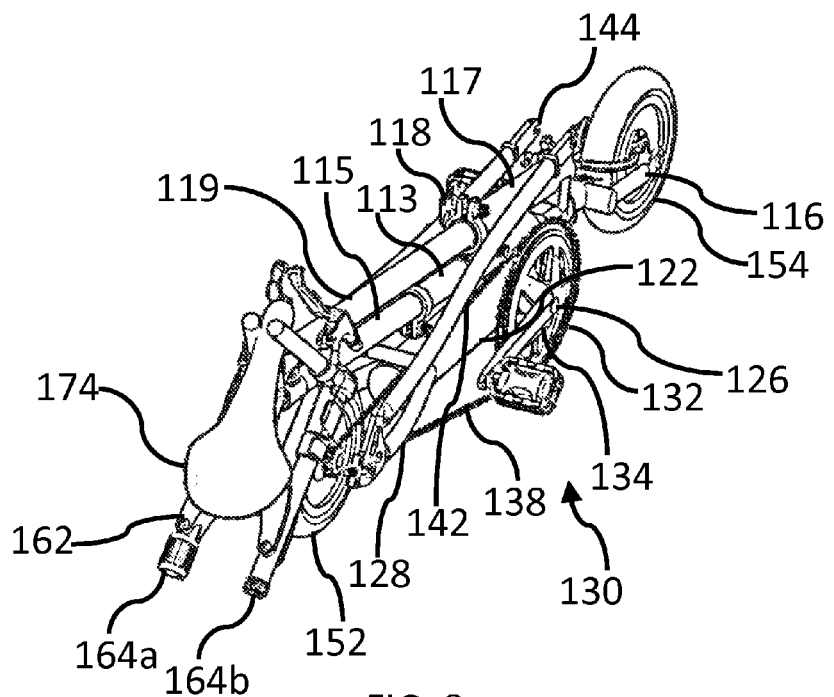
FIG. 8 illustrates a right-side perspective view of the example vehicle in the fully folded arrangement.
Figure 9:
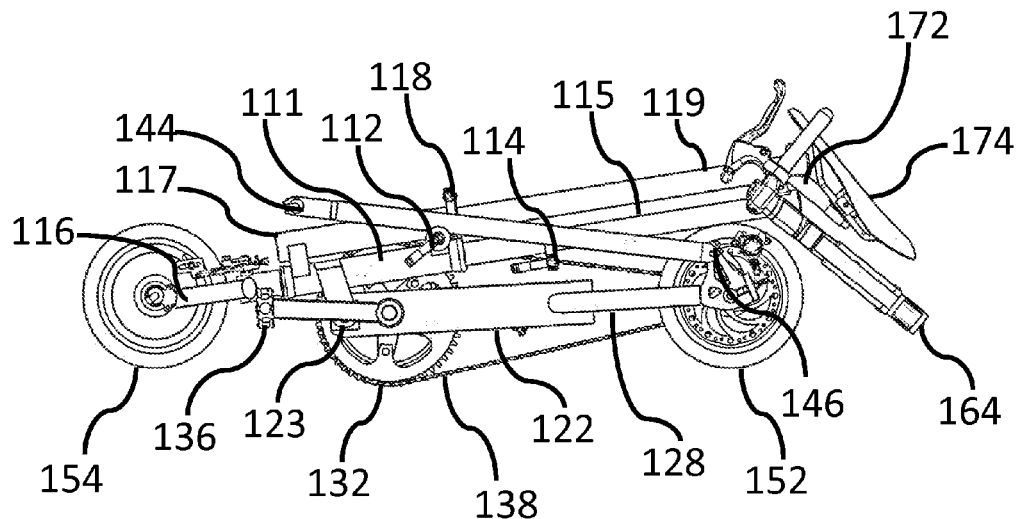
FIG. 9 illustrates a left side elevation view of the example vehicle in the fully folded arrangement.

FIGS. 1-8 illustrate an example vehicle 100 in the form of a bicycle. FIGS. 1-5 illustrate the example vehicle in an expanded, riding arrangement while FIGS. 7-9 illustrate the example vehicle in a folded arrangement. All illustrations of the drawings are for the purpose of describing example embodiments and are not intended to limit the scope of the present disclosure.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Referring generally to FIGS. 1-5, underpinning vehicle 100 is main frame assembly 120 including a main frame member 122 extending substantially in the fore and aft directions. Rear wheel carriers 128 extend from main frame member 122 along a first orientation and crankset bottom bracket 126 protrudes from main frame member 122 along a second orientation to provide support for a crankset 132. In an example, crankset bottom bracket 126 extends substantially perpendicular from rear wheel carriers 128 and main frame member 122.

Crankset 132 is rotatably mounted on bottom bracket 126 and includes a plurality of cranks 134. Crankset 132 may be mechanically coupled with gear sprocket 139 by a chain or belt 138 for inducing a rotation of rear wheel 152 when gear sprocket 139 is driven by cranks 134. The elevation of crankset bottom bracket 126 above a surface upon which the vehicle is supported may vary with varying dimensions of vehicle components and with the elevation of a line joining the center of wheels 152 and 154.

A front assembly 110 is disposed at a front end of main frame assembly 120 and comprises a head tube 111, a seat tube 117, a steering tube 113 rotatably received in head tube 111, a fork 116 rotatably coupled with head tube 111, a steering assembly 160 and a seat post 119. Seat tube 117 is configured to receive and support a saddle 174 by insertion of seat post 119 therein. Head tube 111 is located between seat tube 117 and crankset bottom bracket 126.

Fork 116 includes a crown which couples with steering tube 113 from the bottom and is thus rotatably coupled to head tube 111 by receipt therein. Telescopic extension 115, also formed to be received within steering tube 113, enables adjustment of the height of steering control assembly 160. A steering tube clamp 114 is configured to lock telescopic extension 115 in position at a selected fixed height.

Seat post 119, steering tube 113 and telescopic extension 115 cooperate to enable vehicle 100 to fit adult riders of varying stature when in the expanded arrangement.

A front wheel 154 is rotatably connected to fork 116 at its hub and dictates the direction of travel of vehicle 100 in accordance with rotation of steering tube 113 by way of steering control assembly 160. Rear wheel 152 is disposed at the rearward end of main frame assembly 120 and is rotatably coupled with rear wheel carrier 128 at the hub of wheel 152. A vertical longitudinal plane is defined through the center of rear wheel 152 and includes a normal line through the rear wheel rotational axis.

Rear wheel 152 and front wheel 154 each include a hub with an axle, and a pneumatic or solid rubber tire. In an example, front and rear wheels 154 and 152 are of a reduced diameter form similar to those used in adult kick scooters and frequently referred to as micro-wheels. As micro-wheels, front and rear wheels 154 and 152 may be of a diameter smaller than twice a single crank length. Alternatively, the diameter of the wheels 152 and 154 are such that when front wheel 154 is turned, it will not interfere with crank 134. Alternatively, front and rear wheels 154 and 152 may be of a diameter approximately equal to that of the chain ring of crankset 132. Wheels 152 and 154 may be between approximately 10 cm and approximately 25 cm in diameter, although larger or even smaller wheels may also be suitable.

Figure 1:
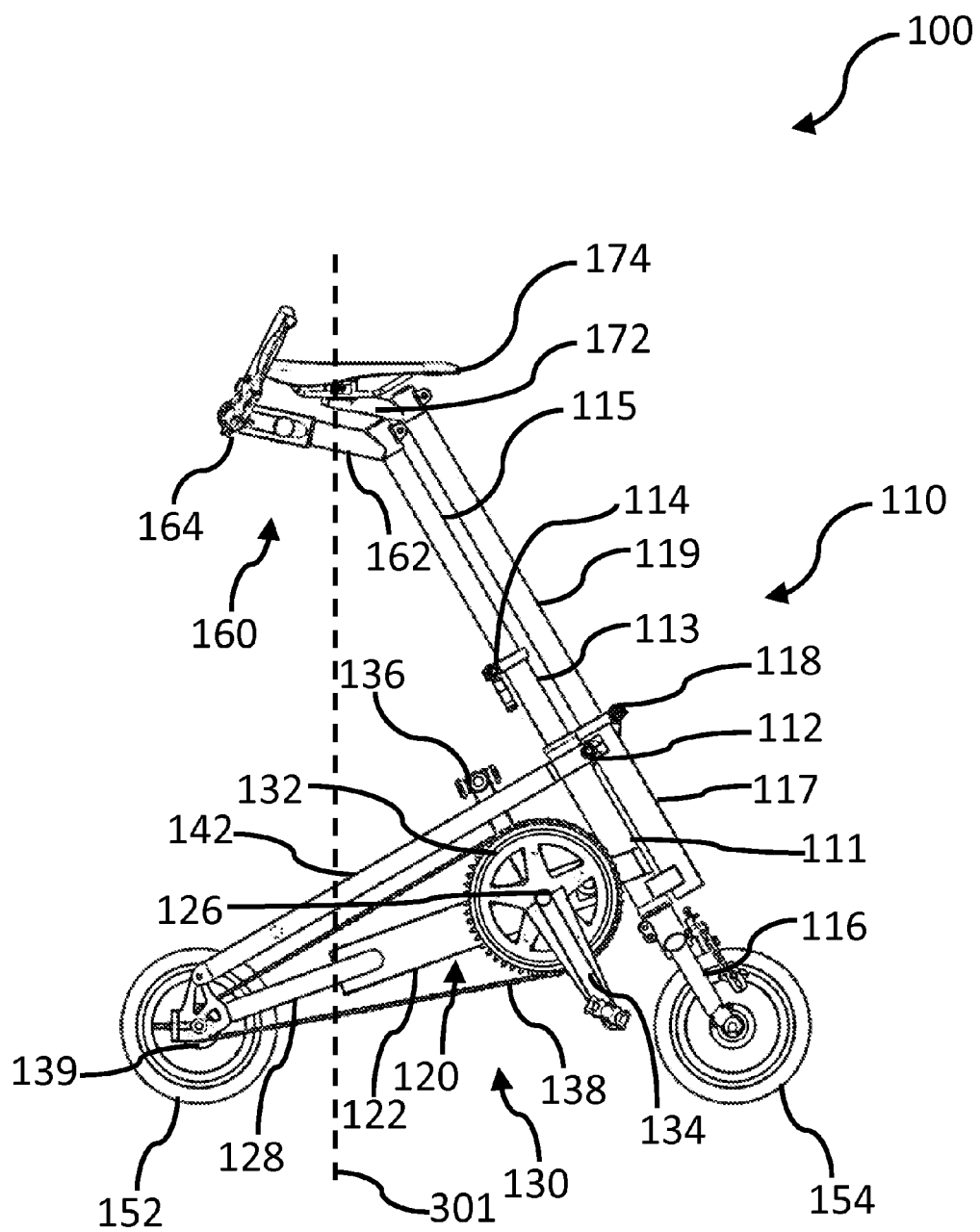
FIG. 1 illustrates a right side elevation view of an example vehicle in an expanded, riding arrangement.
Figure 2:
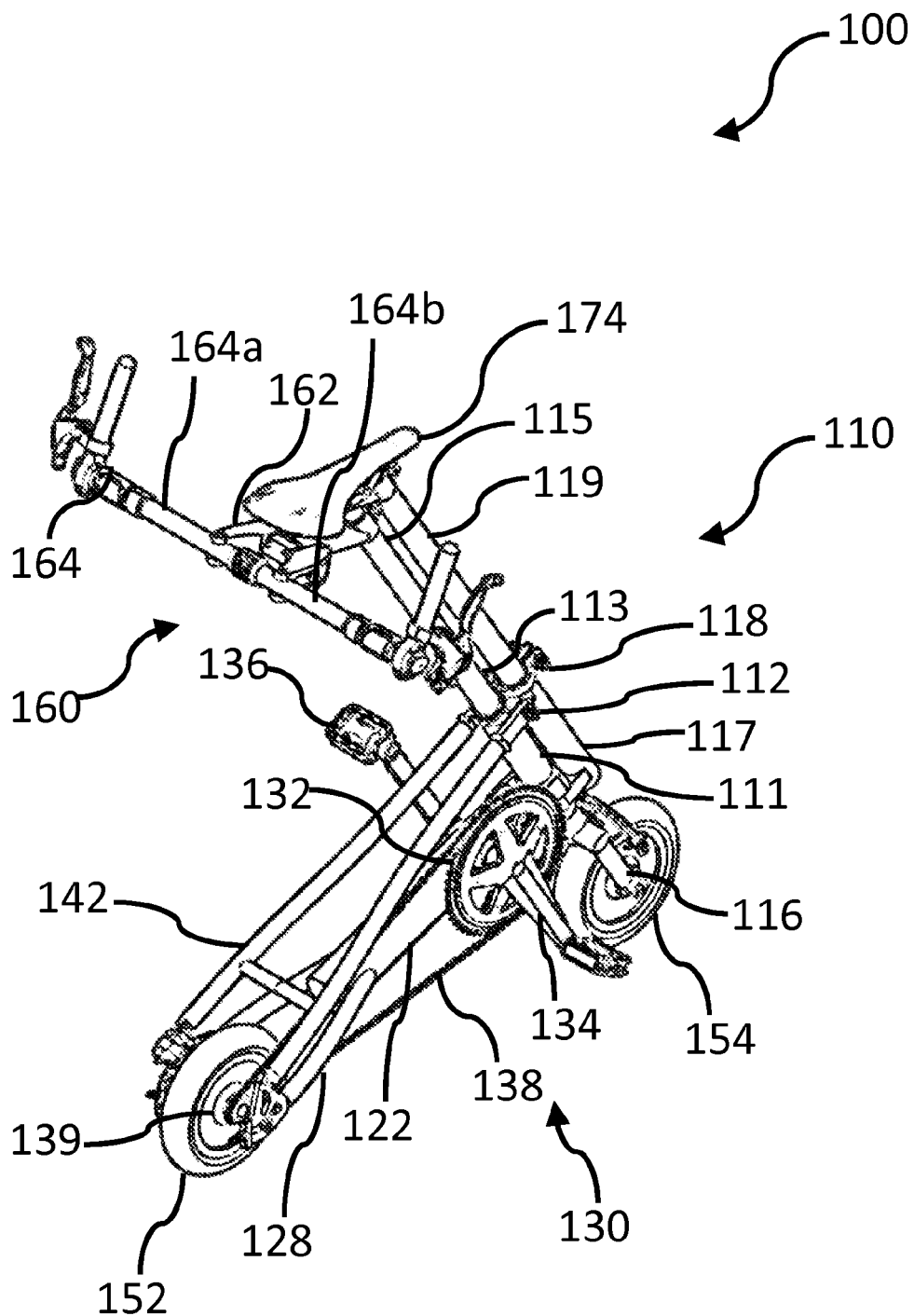
FIG. 2 illustrates a right-side perspective view of the example vehicle in the expanded, riding arrangement.
Figure 3:
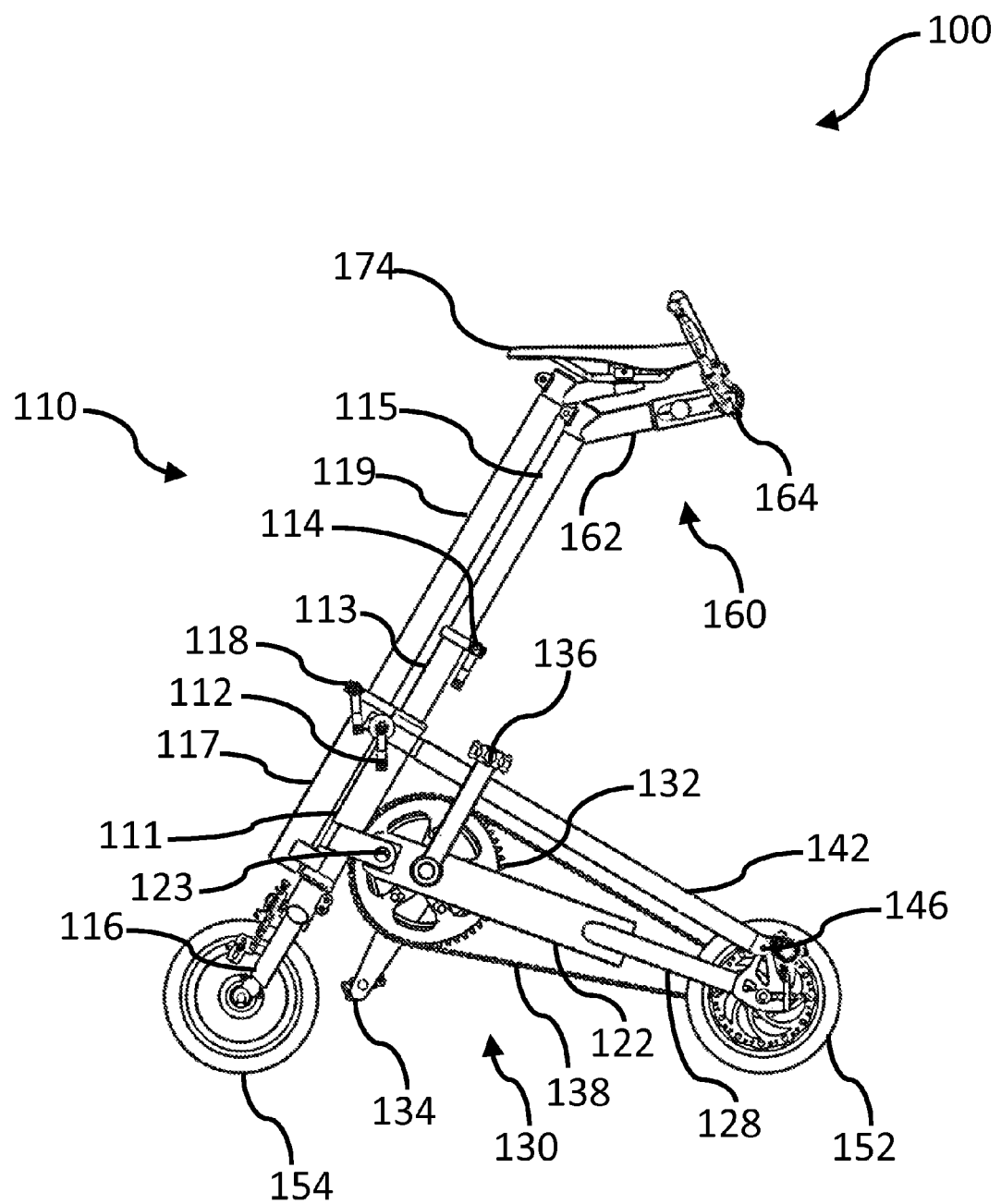
FIG. 3 illustrates a left side elevation view of the example vehicle in the expanded, riding arrangement.

Seat tube 117 may be hollow and open at both ends, so as to receive seat post 119 inserted from the top. In turn, seat post 119 is slidably engaged with seat tube 117 and may be secured in position with a seat post clamp 118. Seat tube 117 and head tube 111 may be provided in a tandem arrangement such that seat tube 117 is spaced a small distance in front of and approximately parallel to head tube 111. For example, head tube 111 may be adjacent to seat tube 117 and separated therefrom by a distance less than a diameter of head tube 111 even when the vehicle is in the expanded arrangement. In an example, head tube 111 is generally located between seat tube 117 and rear wheel 152 and may be provided integral with, as one piece with or rigidly joined to seat tube 117. In an expanded arrangement, a vertical transverse plane 301 through the midpoint of saddle 174 is located behind crankset bottom bracket 126 (FIG. 1).

Steering control assembly 160 includes a handlebar stem 162 rotatably coupled with head tube 111 and configured to clamp to the top end of steering tube 113 or telescopic extension 115 for supporting a handlebar 164. Using handlebar 164 to rotate extension 115 and steering tube 113 within head tube 111 is effective to angle front wheel 154 towards the left or the right of the vertical longitudinal plane to steer vehicle 100.

Steering control assembly 160 may be disposed proximal to, underneath and rearward from saddle 174 such that with vehicle 100 in the expanded, riding arrangement, handlebar 164 is disposed between saddle 174 and rear wheel 152. More precisely, a vertical line extending through handlebar 164 is between a vertical line extending through the center of seat 174 and a vertical line extending through center of rear wheel 152. In the expanded arrangement, handlebar 164 is additionally generally disposed in a perpendicular orientation relative to handlebar stem 162.

In an example, handlebar 164 further includes left 164a and right 164b portions (FIG. 2) configured to independently pivot within a common plane to collapse towards the vertical longitudinal plane of the vehicle. In the folded arrangement, left and right portions 164a and 164b are adjacent to and parallel with handlebar stem 162 (FIGS. 7-9). Right portion 164b includes a male engagement and the left portion 164a includes a female engagement configured to receive the right portion such that the conjoined left and right portions provide a single piece handlebar. Equivalently, left portion 164a may be provided with a male engagement and right portion 164b may be provided with a female engagement for receiving the male engagement. Other means of temporarily and selectively joining portions 164a and 164b may also be used.

Main frame assembly 120 further comprises elongate seat stays 142 pivotally coupled with rear wheel carriers 128 distal from main frame member 122. Seat stays 142 are detachably coupled to front assembly 110 proximal to upper end of seat tube 117. Cooperation of seat stays quick release 112 (FIG. 3) with seat stays latches 144 (FIGS. 7-9) enables selective locking of seat stays 142 to front assembly 110. When uncoupled from front assembly 110, seat stays 142 are configured to pivot about a hinge 146 (FIG. 3) relative to rear wheel carrier 128 and main frame member 122.

A hinge joint 123 (FIG. 3) provided on main frame member 122 at a location proximal to head tube 111 pivotally couples main frame member 122 with front assembly 110 such that the angle between main frame member 122 and head tube 111 may be changed. As such, frame hinge 123 is additionally configured to vary an angle between main frame member 122 and a wheelbase line drawn between front and rear wheels 154 and 152. With seat stays latches 144 disengaged from quick release 112, frame hinge 123 is configured to vary a distance between saddle 174 and rear wheel 152 while the distance between saddle 174 and front wheel 154 is maintained.

Frame hinge 123 is also configured to vary the distance between front wheel 154 and rear wheel 152 with a single pivot at hinge 123 as well as vary the distance between crankset bottom bracket 126 and the wheelbase of front and rear wheels 154 and 152.

When in the expanded arrangement, the measure of the angle defined between main frame member 122 and front assembly 110 plus the measure of the angle defined between main frame member 122 and seat stays 142 plus the measure of an angle defined between seat stays 142 and front assembly 110 sum to approximately 180 degrees so that, in a side profile view, seat stays 142, main frame assembly 122 and front assembly 110 resemble a triangular shape.

When in the operative riding arrangement (FIGS. 1-5), vehicle 100 is arranged so as to have dimensions and adjustable saddle and handlebar positions that will fit adult riders of varying stature. In an operative straight-ahead and expanded riding arrangement, vehicle 100 is normally symmetrically disposed in relation to the vertical longitudinal plane.

Figure 4:
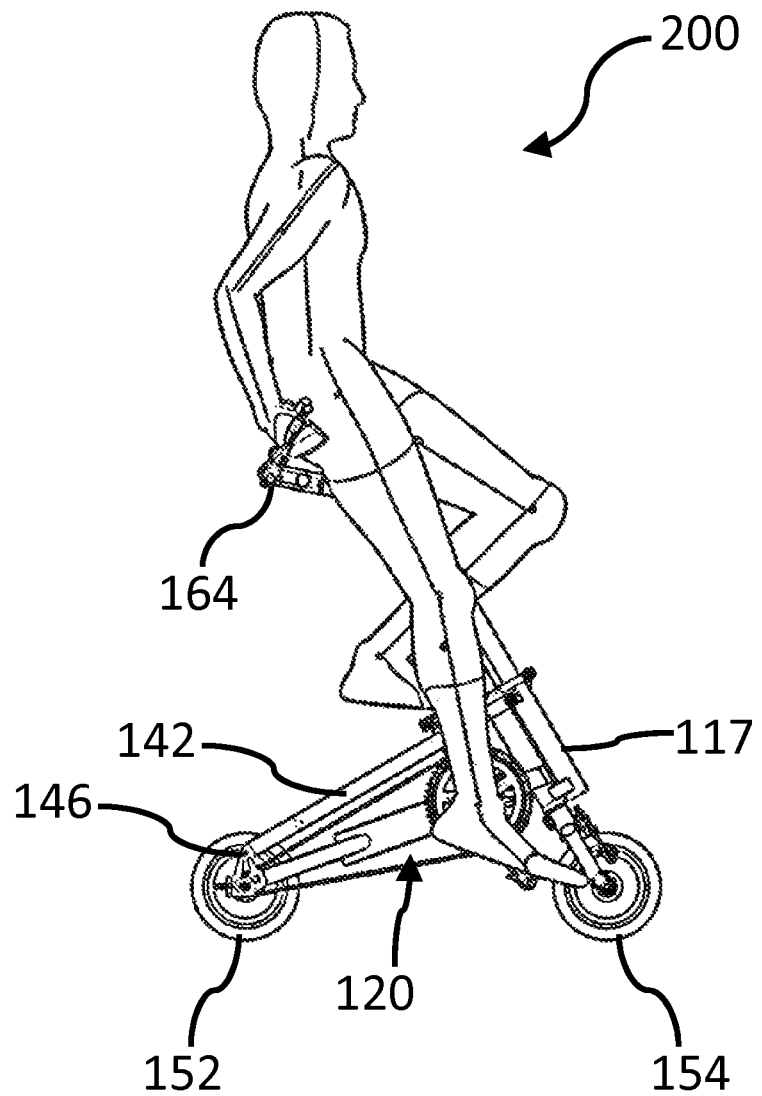
FIG. 4 illustrates a right side elevation view of a rider on an example vehicle in a typical riding position.

Referring to FIGS. 4 and 5, a rider 200 may sit upright on saddle 174, with feet on pedals 136 to drive cranks 134. Rider 200 may steer vehicle 100 using handlebar 164 to pivot front wheel 154 out of the vertical longitudinal plane. In riding use, seat stays latches 144 are secured to front assembly 110 by use of seat stays quick release 112, and the combined effect of the weight of the vehicle and a rider will keep the joint locked, as if the vehicle were rigid.

The height of saddle 174 may be adjusted by raising or lowering seat post 119. Once set, seat post 119 may be secured to seat tube 117 by quick-release seat post clamp 118. Similarly, the height of handlebar 164 may be adjusted by raising or lowering telescoping portion 115 of steering tube 113 and securing it in place with a quick-release steering tube clamp 114.

Referring to FIGS. 7-9, when in a completely folded arrangement, seat stays latch 144 is uncoupled from front assembly 110 and front assembly 110 is pivoted rearward and downward about main frame hinge 123 until steering tube 113 is positioned close to main frame member 122 and rear wheel 152 (FIGS. 7-9). Handlebar 164 is folded such that portions 164*a* and 164*b* lie close to the vertical longitudinal plane and seat stays 142 pivot relative to main frame member 122 to decrease the angle therebetween. Generally, the height difference between crankset bottom bracket 126 and the wheelbase is less in the folded arrangement than in the expanded arrangement (FIG. 7).

The body of the main frame assembly 120, as well as seat stays 142 may be formed from any of a variety of materials including but not limited to hollow metal, plastic or composite tubes. The axes of bottom bracket 126, frame hinge joint 123 and the axle of wheel 152 are substantially perpendicular to the longitudinal vertical plane. When vehicle 100 rolls straight forward, the axle of front wheel 154 is also substantially perpendicular to the longitudinal vertical plane.

As with main frame assembly 120, head tube 111, seat tube 117, fork 116, steering tube 113, handlebar stem 162, handlebar 164, and seat post 119 of front assembly 110 may be formed of any of a variety of materials including but not limited to hollow metal, plastic or composite tubes.

Crank set 132, chain 138, gear sprocket 139, quick release clamps 114, 118, and saddle 174 are common bicycle components that are readily available or producible by one having ordinary skill in the art.

Referring to FIGS. 6-8, the procedure for folding vehicle 100 is described in the following sequence of actions.

A handlebar quick release is unfastened and the handlebar is folded such that portions 164*a* and 164*b* lie close to the vertical longitudinal plane.

Quick release 112 is unfastened and seat stays latch 144 is uncoupled from front assembly 110.

Front assembly 110 is folded by pivoting rearward and downward about main frame hinge 123 until steering tube 113 is positioned close to main frame member 122 and rear wheel 152 (FIG. 6). Head tube 111 and seat tube 117 pivot together relative to the main frame member 122 on a single hinge 123 during conversion between expanded and folded arrangements.

It should be noted that the steps of the method for folding a vehicle may be performed in different sequences. For example, front assembly 110 may be pivoted rearward and downward to a position close to main frame member 122 and rear wheel 152 and then handlebar 164 may subsequently be folded.

In the folded arrangement, the crankset bottom bracket is closer to a wheelbase of the front and rear wheels than when in the expanded arrangement.

Figure 10:
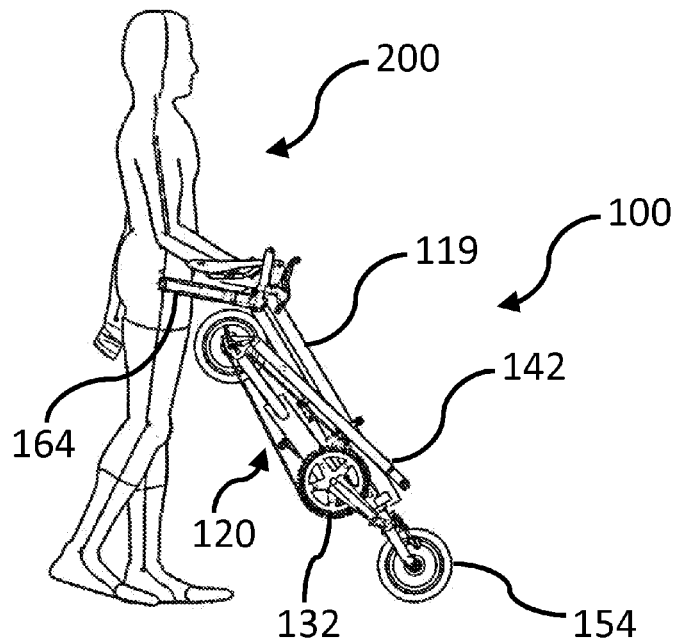
FIG. 10 illustrates a right-side perspective view of the example vehicle in the folded arrangement and being rolled by a user.

When in the folded arrangement, front and rear wheels 154 and 152 do not overlap and vehicle 100 represents a compact, long and narrow package. Referring to FIG. 10, when in the folded arrangement, the vehicle may be supported with the saddle 174, the handlebar 164 and the rear wheel 152 elevated or substantially upright for moving by rolling on the front wheel 154.

Return of the vehicle to the operative riding position is achieved by reversing the folding action and re-securing all the hinges and fastening devices. Front assembly 110 is folded by pivoting it upward and forward about main frame hinge 123 to move head tube 111 away from main frame member 122 and rear wheel 152. Seat stays latches 144 are then coupled to front assembly 110 and seat stays quick release 112 is secured. Next, handlebar 164 is unfolded such that portions 164*a* and 164 are pivoted away from the vertical longitudinal plane and form a single handlebar 164. With handlebar portions 164*a* and 164*b* in position, handlebar quick release 118 may be fastened.

Both folding and unfolding of the bicycle are thus accomplished quickly and easily.

In an example, to further increase the length of the seat post 119 so as to allow for a greater seat height, a telescoping design may be employed whereby seat post 119 consists of two sections slidably engaged with one another. In another example, an adjustable saddle stem 172 may be provided to allow saddle 174 to move further back for riders with longer thigh length. In yet another example, a locking means may be provided for locking the main frame hinge 123 in the folded arrangement.

It should be noted that the vehicle shown by way of example in FIGS. 1-10 is not limited to including any particular number of wheels. For example, a vehicle in accordance with the present disclosure may include two, three, four or more wheels or may be provided with a variety of endless track rather than wheels. Furthermore, in some examples a vehicle may be provided with any of a variety electric, combustion or other type of motor rather than, or in addition to, transmission assembly 130. Provision of a motor enables automated driving of rear wheel 152.

Vehicle 100 may be provided in any of a variety of sizes to accommodate persons of varying sizes. In an example, a wheelbase of vehicle 100 may be between approximately 30 cm and approximately 90 cm and the height measured at saddle 174 in the expanded arrangement may similarly be between approximately 30 cm and approximately 90 cm.

Components of vehicle 100 may be provided in any of a variety of shapes.

For example, structural components such as seat stays 142, rear wheel carriers 128 and main frame member 122 may be straight or curved, may exhibit a circular, triangular or rectangular cross section, etc.

While the disclosure has been presented with respect to certain specific embodiments, it will be appreciated that many modifications and changes may be made by those skilled in the art without departing from the spirit and scope of the disclosure. It is intended, therefore, by the appended claims to cover all such modifications and changes as fall within the true spirit and scope of the disclosure.

What is claimed is:

1. A vehicle configured for conversion between expanded and folded arrangements, comprising:
a front assembly including a head tube and a seat tube;
a saddle telescopically coupled with the seat tube;
a main frame assembly including a main frame member pivotally coupled at a front end with the front assembly by a frame hinge enabling pivoting of the front assembly relative to the main frame assembly in a vertical longitudinal plane;
a rear wheel rotatably held by rear wheel carriers extending from the main frame member at a rear end; and
a front wheel rotatably held by a fork rotatably received in the head tube;
wherein the head tube is generally located between the seat tube and the rear wheel; and
wherein the main frame member further comprises a crankset bottom bracket such that, in the folded arrangement, the crankset bottom bracket is closed to a wheelbase of the front and rear wheels than when in the expanded arrangement.

2. The vehicle as set forth in claim 1, wherein the frame hinge is configured to reduce a distance between the saddle and the rear wheel while a distance between the saddle and the front wheel is maintained.

3. The vehicle as set forth in claim 1, wherein the frame hinge is configured to vary an angle between an axis of the head tube and an axis of the main frame member.

4. The vehicle as set forth in claim 1, wherein, the head tube is proximal to the seat tube.

5. The vehicle as set forth in claim 1, further comprising:
a steering tube rotatably received in the head tube;
an extension telescopically received in the steering tube; and
a seat post telescopically received in the seat tube and coupled with the saddle; wherein, the seat post, the steering tube and the extension cooperate to enable the vehicle to fit adult riders of varying stature when in the expanded arrangement.

6. The vehicle as set forth in claim 1, wherein the frame hinge enables the steering tube to come into contact with the rear wheel in the folded arrangement.

7. The vehicle as set forth in claim 1, further comprising a handlebar supported by a handle bar stem rotatably coupled with the head tube, wherein, with the vehicle in the expanded arrangement, the handlebar is disposed between the saddle and the rear wheel.

8. The vehicle as set forth in claim 7, wherein the handlebar comprises right and left portions configured to independently collapse towards a vertical longitudinal plane of the rear wheel.

9. The vehicle as set forth in claim 1, wherein, in the expanded arrangement, a vertical transverse plane through the mid-point of the saddle is located behind the bottom bracket.

10. The vehicle as set forth in claim 1, further comprising, rotatably coupled to the crankset bottom bracket, a crankset comprising a plurality of cranks wherein there is no interference between the front wheel and the crank during pedaling and steering.

11. The vehicle as set forth in claim 1, wherein the head tube is located between the seat tube and the frame hinge.

12. A vehicle configured for conversion between expanded and folded arrangements, comprising:
a front assembly including a head tube and a seat tube;
a saddle telescopically coupled with the seat tube;
a fork rotatably received in the head tube;
a handlebar supported by a handle bar stem rotatably coupled with the head tube;
a main frame assembly including rear wheel carriers extending from a rear end of a main frame member provided with a crankset bottom bracket;
a frame hinge pivotally coupling the front assembly to the main frame member at a front end of the main frame member;
rotatably coupled to the crankset bottom bracket, a crankset comprising a plurality of cranks;
a front wheel rotatably held by the fork;
a rear wheel rotatably held by the rear wheel carriers; and
wherein the head tube is disposed behind the seat tube;
wherein there is no interference between the front wheel and the crank during pedaling and steering; and
wherein the frame hinge enables pivoting of the front assembly relative to the main frame assembly in a vertical longitudinal plane.

13. The vehicle as set forth in claim 12, wherein, when in the folded arrangement, the vehicle represents a compact, long and narrow package.

14. The vehicle as set forth in claim 12, wherein the main frame assembly further comprises elongate seat stays coupled with the rear wheel carrier and wherein each seat stay includes a latch configured for locking with a quick release provided to the front assembly; and
wherein the seat stays are configured to pivot relative to the rear wheel carriers and the main frame member when disengaged from the quick release.

15. The vehicle as set forth in claim 12, wherein, when in the folded arrangement, the vehicle may be supported with the saddle, the handlebar and the rear wheel elevated for moving by rolling on the front wheel.

16. A vehicle configured for conversion between expanded and folded arrangements, comprising:
a front assembly including a head tube and a seat tube;
a saddle telescopically coupled with the seat tube;
a fork rotatably received in the head tube;
a handlebar supported by a handle bar stem rotatably coupled with the head tube;
a main frame assembly including rear wheel carriers extending from a main frame member at the rear end provided with a crank set bottom bracket;
a coupling connecting the front assembly to the main frame member at the front end;
rotatably coupled to the crank set bottom bracket, a crank set comprising a plurality of cranks;
a front wheel rotatably held by the fork;
a rear wheel rotatably held by the rear wheel carriers; and
wherein, in the expanded arrangement, a vertical transverse plane through the mid-point of the saddle is located behind the bottom bracket;
wherein there is no interference between the front wheel and the crank during pedaling and steering;
wherein the frame coupling enables pivoting of the front assembly relative to the main frame assembly in a vertical longitudinal plane;
wherein the head tube is substantially parallel and proximal to the seat tube;
wherein from a side view the rear wheel carriers are substantially aligned with the main frame member;
wherein the main frame assembly further comprises elongate seat stays coupled with the rear wheel carriers and wherein each seat stay includes a latch configured for locking with a quick release provided to the front assembly;

wherein the main frame member, the front assembly and one of the seat stays form a triangle in the expanded arrangement; and wherein the seat stays are configured to pivot relative to the rear wheel carriers and main frame member when uncoupled from the front assembly.

17. The vehicle as set forth in claim 16, wherein, with the vehicle in the expanded arrangement, the handlebar is disposed under and behind the mid-point of the saddle.

18. The vehicle as set forth in claim 16, wherein the frame hinge enables the steering tube to come into contact with the rear wheel in the folded arrangement.

19. A vehicle configured for conversion between expanded and folded arrangement comprising:

a front assembly including a head tube and a seat tube;
a saddle telescopically coupled with the seat tube;
a fork rotatably received in the head tube;
a handlebar supported by a handle bar stem rotatably coupled with the head tube;
a main frame assembly including rear wheel carriers extending from a main frame member at a rear end;
a coupling connecting the front assembly to the main frame member at a front end;
a front wheel rotatably held by the fork; and
a rear wheel rotatably held by the rear wheel carriers;

wherein, in the expanded arrangement, a vertical transverse plane through a mid-point of the saddle is located behind the front wheel;

wherein the coupling enables pivoting of the front assembly relative to the main frame assembly in a vertical longitudinal plane;

wherein the head tube is substantially parallel to the seat tube and proximal to the seat tube;

wherein from a side view the rear wheel carriers are substantially aligned with the main frame member;

wherein the main frame assembly further comprises elongate seat stays coupled with the rear wheel carriers and each including a latch configured for locking with a quick release provided to the front assembly;

wherein the main frame member, the front assembly and one of the seat stays form a triangle in the expanded arrangement; and wherein the seat stays are configured to pivot relative to the rear wheel carriers and main frame member when uncoupled from the front assembly.

\* \* \* \* \*